United States Patent [19]

Trisno

[11] Patent Number: 5,119,447
[45] Date of Patent: Jun. 2, 1992

[54] APPARATUS AND METHOD FOR EXTERNALLY MODULATING AN OPTICAL CARRIER

[75] Inventor: Yudhi Trisno, Newtown, Pa.

[73] Assignee: General Instrument Corporation, Hatboro, Pa.

[21] Appl. No.: 609,808

[22] Filed: Nov. 6, 1990

[51] Int. Cl.⁵ ............................................. G02B 6/10
[52] U.S. Cl. ........................................ 385/3; 385/2; 385/4
[58] Field of Search ............... 350/96.14, 96.12, 96.11; 385/1, 2, 3, 4, 5, 6, 7, 8, 9, 10, 11

[56] References Cited

U.S. PATENT DOCUMENTS

| | | | |
|---|---|---|---|
| 4,763,974 | 8/1988 | Thaniyavarn | 350/96.14 |
| 4,776,657 | 10/1988 | Reeder | 350/96.14 |
| 4,932,738 | 6/1990 | Haas et al. | 350/96.14 |
| 4,936,644 | 6/1990 | Raskin et al. | 350/96.14 |
| 4,936,645 | 6/1990 | Yoon et al. | 350/96.14 |
| 5,031,235 | 7/1991 | Raskin et al. | 350/96.15 X |

OTHER PUBLICATIONS

W. I. Way, "Subcarrier Multiplexed Lightwave System Design Considerations for Subscriber Loop Applications", *Journal of Lightwave Technology*, vol. 7, pp. 1806–1818 (1989).

G. E. Bodeep and T. E. Darcie, "Semiconductor Lasers Versus External Subcarrier CATV Applications", *IEEE Photonics Technology Letters*, vol. 1, pp. 401–403 (1989).

K. T. Koai and P. L. Liu, "Digital and Quasi-Linear Electrooptic Modulators Synthesized from Directional Couplers", *IEEE Journal of Quantum Electronics*, QE-22, pp. 2191–2194 (1986).

L. M. Johnson and H. V. Roussell, "Reduction of Intermodulation Distortion in Interferometric Optical Modulators", *Optics Letters*, vol. 13, pp. 928–930 (1988).

*Primary Examiner*—John D. Lee
*Assistant Examiner*—Phan T. Heartney
*Attorney, Agent, or Firm*—Barry R. Lipsitz

[57] ABSTRACT

An external electrooptic modulator is provided offering high linearity and low intermodulation distortion. A Mach Zehnder modulator is followed by a directional coupler. The Mach Zehnder modulator is modulated with a first pair of electrodes at a first polarity. The modulating signal is scaled by a factor $\eta$ and applied to a separate pair of electrodes for the directional coupler at a second polarity opposite to the first polarity. Separate DC bias electrodes can be provided in the Mach Zehnder modulator. The modulator is particularly appropriate for use in optical transmission systems for cable television applications.

16 Claims, 3 Drawing Sheets

APPARATUS AND METHOD FOR EXTERNALLY MODULATING AN OPTICAL CARRIER

BACKGROUND OF THE INVENTION

The present invention relates to optical modulators, and more specifically to a technique for linearizing the output of an external optical intensity modulator.

Recently, there has been a growing interest in the development of analog, amplitude modulated optical communication systems. In comparison with digital systems, analog communication systems provide an efficient use of bandwidth. This is particularly useful in cable television (CATV) transmission system applications, where it is necessary to transmit a large number of video channels through an optical fiber. Compatibility with existing equipment is achieved by using the same signal format for optical transmission that is in use for coaxial cable signal transmission.

In order to transmit an information signal (e.g., a television signal) over an optical fiber, a light beam ("carrier") must be modulated with the information signal. The "electrooptic effect" has been advantageously used to provide modulators for this purpose. For example, electrooptic modulators using miniature guiding structures are known which operate with a low modulating power.

In electrooptic modulators, the electric field induced linear birefringence in an electrooptic material produces a change in the refractive index of the material which, in turn, impresses a phase modulation upon a light beam propagating through the material. The phase modulation is converted into intensity modulation by the addition of polarizers or optical circuitry. Ideally, an electrooptic modulator should have a linear relationship between its output optical power and the applied modulating voltage.

In a "Mach Zehnder" type electrooptic modulator, an optical carrier (laser beam) is split into two paths. At least one path is electrically phase modulated. The two signals are then recombined in an interferometer to provide an intensity modulated carrier. Typically, lithium niobate ($LiNbO_3$) is used as the electrooptic material. Waveguides in such materials are readily formed by titanium indiffusion.

The output power curve of a Mach Zehnder modulator is nonlinear. Practical analog optical communications systems, however, demand a high linearity. See, for example, W. I. Way, "Subcarrier Multiplexed Lightwave System Design Considerations for Subscriber Loop Applications", J. Lightwave Technol., Vol. 7, pp. 1806-1818 (1989). Modulator nonlinearities cause unacceptable harmonic and intermodulation distortions. When it is necessary to communicate a large number of channels, as in a CATV application, intermodulation distortions ("IMD") can impose serious limitations on the system performance. In principle, the second order IMD can be filtered out if the bandwidth is less than one octave. However, CATV transmission systems operate with bandwidths of many octaves. The third order IMD can only be eliminated by using devices with linear characteristics.

Injection lasers, for example, are not perfectly linear. They can be limited by second order or third order IMD. By using biases well above the threshold and small optical modulation depths, selected injection lasers can barely meet vestigial sideband amplitude modulation CATV system specifications. This limitation is discussed in G. E. Bodeep and T. E. Darcie, "Semiconductor Lasers Versus External Modulators: A Comparison of Nonlinear Distortion for Lightwave Subcarrier CATV Applications", I.E.E.E. Photonics Technol. Lett., Vol. 1, pp. 401-403 (1989).

Electronic precompensating circuits have been proposed to improve the linearity and reduce IMD in laser communication systems. A quasi-linear electrooptic modulator based on a foreshortened directional coupler was proposed in K. T. Koai and P. L. Liu, "Digital and Quasi-Linear Electrooptic Modulators Synthesized from Directional Couplers", IEEE J. Quantum Electron., QE-12, pp. 2191-2194 (1986). Because the modulator proposed in that article uses a short electrode in the directional coupler, a large modulation voltage is required. The resultant inefficiency of such a system is not acceptable for practical CATV signal distribution.

In another prior art system, a Mach Zehnder interferometer with mixed transverse electric ("TE") and transverse magnetic ("TM") polarizations was used to cancel third order IMD. L. M. Johnson and H. V. Roussell, "Reduction of Intermodulation Distortion in Interferometric Optical Modulators", Opt. Lett., Vol. 13, pp. 928-930 (1988). This solution requires a large DC bias and an accurate TE-TM power ratio. In addition, it suffers from low modulation efficiency because a smaller electrooptic term is used. The output power is the sum of two polarization components.

It would be advantageous to provide an optical circuit level compensation technique for linearizing the output of an external optical intensity modulator. It would be further advantageous to provide such a modulator in which IMD distortions are reduced to an acceptably low level. Such apparatus would have particular application in optical fiber CATV distribution systems, wherein a plurality of television channel signals are multiplexed and carried over a single fiber. It would also be advantageous to provide such apparatus that is economical, readily manufacturable, and reliable. The present invention provides such apparatus.

SUMMARY OF THE INVENTION

In accordance with the present invention, an optical modulator comprises means for splitting an optical signal for communication over first and second paths. At least the first path comprises an electrooptic material. An electric field of a first polarity is applied across the first path to phase modulate the signal therein. An electrooptic directional coupler is coupled to the first and second paths. An electric field of a second polarity opposite to the first polarity is applied across the directional coupler to couple optical signals from the first and second paths into an output signal.

Means are provided for biasing the first path at an inflection point to provide a substantially 45° phase shift when no modulating signal is present. The biasing means can comprise a set of electrodes for applying an electric field across the first path. In a preferred embodiment, the bias field is of the same "first" polarity used for the phase modulation.

The means for applying the first polarity electric field can comprise a first set of modulating signal electrodes. The means for applying the second polarity electric field can comprise a second set of modulating signal electrodes. In a preferred embodiment, the optical signal is equally split into the first and second paths with a Y-branch optical power splitter.

The second path of the optical modulator can also comprise an electrooptic material. An electric field applied across the second path will then phase modulate the signal therein. Phase modulation of the signal in both the first and second paths can provide a device with greater sensitivity.

The phase modulation provided by the first and second polarity electric fields originates with a common modulating signal. In a preferred embodiment, the magnitude of the common modulating signal is scaled to modulate the second polarity field at a slightly different level than the first polarity field. This technique is used to minimize distortions in the output signal. The directional coupler of the preferred embodiment has a nominal effective coupling length of $\pi/4$.

DETAILED DESCRIPTION OF THE INVENTION

The present invention provides a linearized optical intensity modulator that can be fabricated from a Y-branch optical power splitter having a first pair of electrodes and a directional coupler having a second pair of electrodes. The electrode pairs are biased at opposite polarities with respect to each other. As a result, the signal driving each pair will have a different slope at the quadrature point corresponding to the bias polarity of the pair. Correction of harmonic nonlinearities results from the provision of a desired coupling coefficient at the directional coupler. Since all compensation is provided in a single substrate, a low cost device is obtained.

Figure 1:
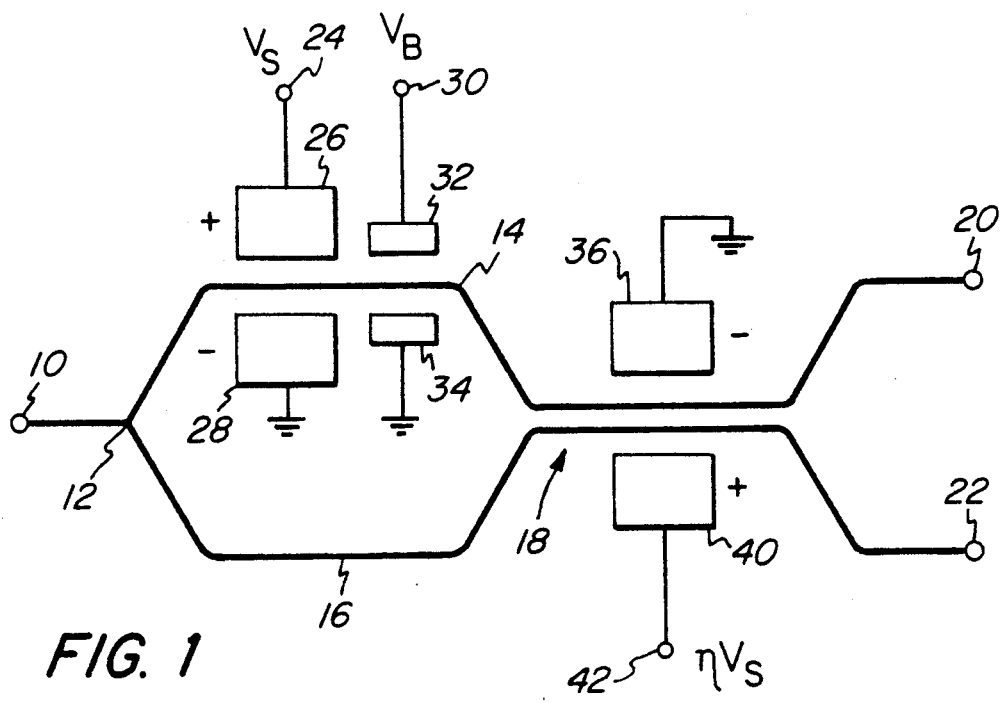
FIG. 1 is a schematic diagram of a first embodiment of the present invention wherein an optical carrier in a first path is phase modulated prior to an electrooptic directional coupler.

FIG. 1 illustrates a first embodiment of a linear electrooptic modulator in accordance with the present invention. An optical carrier (e.g., laser beam) is input at a terminal 10 and split by a Y-branch optical power splitter 12 into a first path 14 and a second path 16. A pair of modulation signal electrodes 26, 28 provides an electric field across first path 14 when a modulating signal $V_S$ is input at terminal 24. The field across first path 14 will have a first polarity as indicated in FIG. 1. A separate pair of bias electrodes 32, 34 is provided to establish a bias field across first path 14 upon the application of a bias voltage $V_B$ at terminal 30. The bias voltage biases first path 14 at the inflection point of $\pi/4$ (i.e., to provide a 45° phase shift to the optical signal propagating therethrough).

A directional coupler generally designated 18 couples light from the first and second paths 14, 16 respectively for output at terminals 20, 22. Like first path 14, the directional coupler is fabricated from an electrooptic material that responds to an electric field provided thereacross. The electric field is provided by a pair of electrodes 36, 40. The modulating signal $V_S$ scaled by a factor $\eta$ is input at terminal 42 to provide an electric field across the directional coupler at a polarity opposite to the electric field across first path 14.

Figure 2:
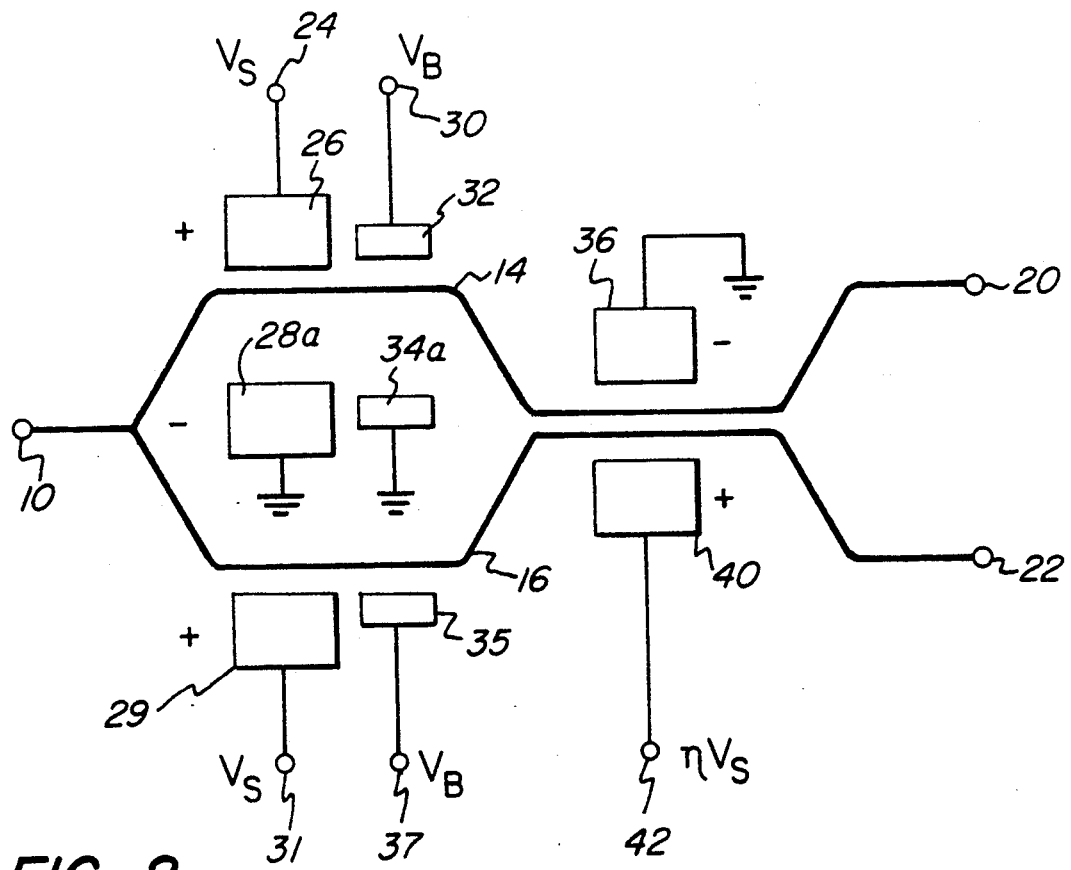
FIG. 2 is an alternate embodiment of the present invention wherein the optical carrier is phase modulated in first and second paths, prior to an electrooptic directional coupler.

FIG. 2 illustrates an alternate embodiment of the present invention wherein an electric field is provided across second path 16 of the Mach Zehnder modulator by additional electrodes 29, 35. Input of the signal voltage $V_S$ at terminal 31 establishes a field between electrode 28a and electrode 29 having the polarity indicated. Second path 16 is biased by an electric field between electrodes 34a and 35 when the bias voltage $V_B$ is input to terminal 37. The provision of electrodes adjacent both the first and second paths provides a modulator having greater sensitivity.

Those skilled in the art will appreciate that the modulator of the present invention is essentially a Mach Zehnder modulator followed by a directional coupler. Each device is separately known in the art. See, e.g., the article to Koai and Liu referred to above. In accordance with the present invention, these devices are combined into a novel structure wherein a common modulating signal is applied to both devices via separate electrodes and at opposite polarities. The use of separate DC bias electrodes 32, 34 on the Mach Zehnder portion avoids heating in the main electrode 26. The separate biasing electrodes do not require a termination resistor, and therefore only a minimal amount of power is consumed as compared to the alternative of applying the bias voltage together with the signal voltage to electrode 26.

The Mach Zehnder portion of the present modulator has the following response:

$$I = I_0 \cos^2(\Delta\beta L),$$

where $2\Delta\beta L$ is the phase difference between the signals in paths 14 and 16. $I_0$ is the input optical power. The directional coupler portion of the modulator provides:

$$I = I_o \frac{k^2}{k^2 + \Delta\beta^2} \sin^2(\sqrt{k^2 + \Delta\beta^2} L),$$

where k is the coupling constant, L is the length, and $\Delta\beta = (\beta_1 - \beta_2)/2$. $\beta_1$ and $\beta_2$ are the wave vectors in the two waveguides. Biased at the inflection point of $\pi/4$, each portion taken separately can provide a null for the second harmonic and intermodulation distortions. However, the third harmonic and intermodulation distortions are at or near their maxima in conventional separate Mach Zehnder and directional coupler devices.

In accordance with the present invention, Y-branch optical power splitter 12 divides the optical power at terminal 10 equally into two arms of the Mach Zehnder modulator, which operates as a phase shifter. The directional coupler that follows the Mach Zehnder modulator has a nominal coupling constant length product kL, of $\pi/4$, i.e., half a coupling length. The output can be taken from either of the two output waveguides at terminals 20, 22. The modulation signal applied to the phase shifter produces a $\Delta\beta$. The same modulation signal with a reversed polarity and a multiplication factor, $\eta$, is applied to the directional coupler. This multiplication factor can be optimized for minimal distortions according to the value of kL.

The output can be written as:

$$I = I_0[a_0 + a_1(x - \Delta\beta) + a_2(I - \Delta\beta)^2 + a_3(x - \Delta\beta)^3 + a_4(x - \Delta\beta)^4 + a_5(x - \Delta\beta)^5 + \ldots]$$

where $I_0$ represents the input power, x is the AC modulation signal, and $\Delta\beta$ is essentially the DC bias. The coefficient of the linear term determines the efficiency of the modulator.

Figure 3:
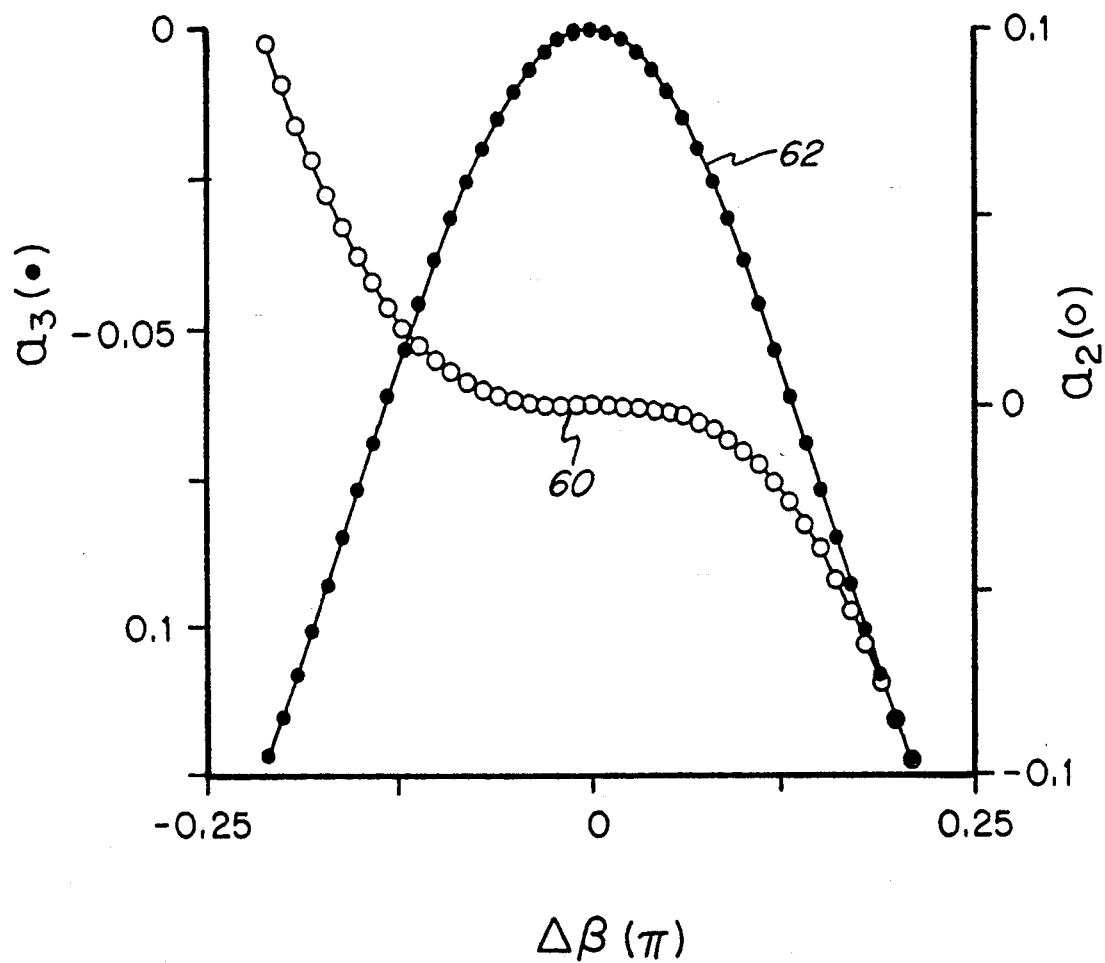
FIG. 3 is a graph illustrating the coefficients of the second and third order terms around the DC bias point in a modulator in accordance with the present invention.

The coefficients of the second order and the third order terms for the modulator of FIG. 1 are shown in FIG. 3 as a function of $\Delta\beta$. The directional coupler section is assumed to have $kL = \pi/4$. $\eta$ is assumed to be 0.947. As shown in FIG. 3, both the second order term 60 (represented by circles) and the third order term 62 (represented by dots) are zero or near zero at $\Delta\beta = 0$. It should be appreciated that there are other combinations of kL and $\eta$ which can also provide nulled second order and third order terms. Depending on the values of $\eta$ and kL used, the coefficient of the third order term may be zero at one or two values of $\Delta\beta$.

In comparison with a Mach Zehnder interferometer, the present modulator, using optimal kL and $\eta$, requires over twice the modulation voltage magnitude to obtain a similar modulation depth. However, the third order harmonic and intermodulation distortions are orders of magnitude lower than those of a conventional Mach Zehnder interferometer.

Figure 4:
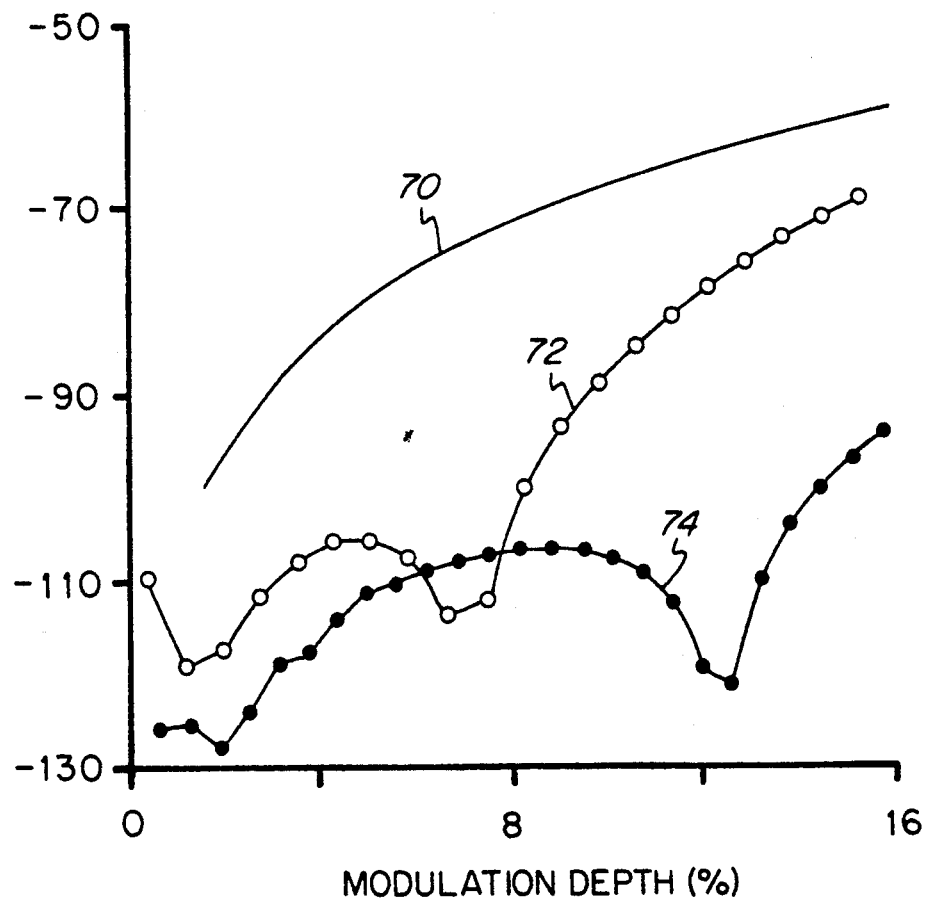
FIG. 4 is a graph comparing the third order harmonic distortions versus modulation depth of a conventional Mach Zehnder interferometer to two embodiments of a modulator in accordance with the present invention.

When modulated by a sinusoidal signal, the harmonic contents in the output of a modulator constructed in accordance with the present invention can be found by computing a fast Fourier transform. FIG. 4 illustrates the third harmonic distortions, defined as 20 log (harmonic content/linear term), versus the optical modulation depth for a conventional Mach Zehnder interferometer (solid curve 70) and for two different linear modulators in accordance with the present invention. One such modulator, represented by curve 72, has $kL = 0.2\pi$ and $\eta = 1.281$. The other modulator, represented by curve 74, has $kL = \pi/4$ and $\eta = 0.95$. When the modulation signal consists of two tones, IMD is present in addition to harmonic distortions. With the same modulation depth for both tones, the third order IMD is three times (i.e, 9.54 dB higher than) the third order harmonic distortion plotted in FIG. 4. Assuming that a $-95$ dB third order IMD is required for CATV applications, the optical modulation depth available from the linear modulator of the present invention is 13% for $kL = \pi/4$ and 8% for $kL = 0.2\pi$. The Mach Zehnder interferometer alone can only offer an optical modulation depth of 1.3%. Among combinations of kL and $\eta$ tested, the largest optical modulation depth, which can be obtained by using $kL = 0.988$ and $\eta = 0.629$, is 16%. Results shown in FIG. 4 indicate that it is not necessary to have $kL = \pi/4$. Any deviation can be partially compensated for by adjusting $\eta$. However, the modulation efficiency may be further reduced. For example, if $kL = 0.2\pi$, the modulation voltage is increased by a factor of 1.47 in comparison with $kL = \pi/4$. Distortions are also larger as shown in FIG. 4. The dips in FIG. 4 result from details in the dependence of the third order coefficient $a_3$ on $\Delta\beta$. The positions of these dips can be varied. For a given kL, by tuning $\eta$, one of the dips can be moved to a larger modulation depth. In other words, the distortion performance can be improved at large modulation depths if a slight deterioration in the distortion performance at small modulation depths can be tolerated. The second order distortions of such electrooptic modulators are always below $-120$ dB when they are biased at their inflection points.

It is noted that the value of $\eta$ (which establishes the scaling of the modulating signal applied to the directional coupler electrodes) must be tightly controlled. A deviation of just 2.5% from the optimal value can increase the third order distortions by 20 dB.

It should now be appreciated that the present invention provides a linear electrooptic external amplitude modulator. Both the second order and third order terms can be nulled simultaneously at zero DC bias. Second order distortions are well below those required for CATV transmission systems. With an optical modulation depth of up to 16% for each channel, third order IMD on the order of $-95$ dB is achievable. The use of an electrooptic modulator as described in conjunction with diode-pumped solid state lasers provides superior performance than directly modulated injection lasers for CATV applications.

Although the invention has been described in connection with several preferred embodiments, those skilled in the art will appreciate that numerous adaptations and modifications can be made thereto without departing from the spirit and scope of the invention, as set forth in the following claims.

What is claimed is:

1. An optical modulator comprising:
   means for splitting an optical signal for communication over first and second paths, wherein at least said first path comprises an electrooptic material;
   means for coupling a modulating signal to apply an electrical field of a first polarity across said first path to phase modulate the signal therein;
   an electrooptic directional coupler coupled to said first and second paths; and
   means for coupling said modulating signal to apply an electric field of a second polarity opposite to said first polarity across said coupler to couple optical signals from said first and second paths into an output signal.

2. An optical modulator in accordance with claim 1 further comprising:
   means for biasing said first path to provide a substantially 45° phase shift.

3. An optical modulator in accordance with claim 2 wherein said biasing means comprise a set of electrodes for applying an electric field across said first path.

4. An optical modulator in accordance with claim 3 wherein:
   said means for applying said first polarity electric field comprise a first set of modulating signal electrodes adjacent said first path; and
   said means for applying said second polarity electric field comprise a second set of modulating signal electrodes adjacent said coupler.

5. An optical modulator in accordance with claim 4 wherein said splitting means comprise a Y-branch optical power splitter.

6. An optical modulator in accordance with claim 1 wherein:
   said means for applying said first polarity electric field comprise a first set of modulating signal electrodes adjacent said first path; and
   said means for applying said second polarity electric field comprise a second set of modulating signal electrodes adjacent said coupler.

7. An optical modulator in accordance with claim 1 wherein said second path comprises an electrooptic material, and further comprising:

means for applying an electric field across said second path to phase modulate the signal therein.

8. An optical modulator in accordance with claim 1 wherein said directional coupler has a nominal effective coupling length of $\pi/4$.

9. An optical modulator in accordance with claim 1 wherein distortions in the output signal are minimized by scaling the magnitude of said modulating signal to provide said second polarity field at a different magnitude than said first polarity field.

10. An optical modulator in accordance with claim 1 wherein said splitting means divide the optical power of said signal equally into said first and second paths.

11. An optical modulator in accordance with claim 10 wherein said splitting means comprise a Y-branch optical power splitter.

12. An optical modulator in accordance with claim 1 wherein said splitting means comprise a Y-branch optical power splitter.

13. A method for externally modulating an optical carrier comprising the steps of:
splitting an optical carrier into first and second portions for input to a Mach Zehnder modulator;
modulating at least said first portion in said Mach Zehnder modulator by applying a modulating signal to a first set of electrodes associated with the Mach Zehnder modulator at a first polarity;
applying the first and second portions from the Mach Zehnder modulator to a directional coupler; and
combining said first and second portions in said directional coupler by applying said modulating signal to a second set of electrodes associated with the directional coupler at a second polarity opposite to said first polarity.

14. A method in accordance with claim 13 comprising the further step of:
scaling the magnitude of said modulating signal prior to applying it to said second set of electrodes.

15. A method in accordance with claim 14 comprising the further step of:
biasing said Mach Zehnder modulator to provide a substantially 45° phase shift to said first portion when no modulating signal is present.

16. A method in accordance with claim 13 comprising the further step of:
biasing said Mach Zehnder modulator to provide a substantially 45° phase shift to said first portion when no modulating signal is present.

* * * * *